United States Patent
Oguchi et al.

(10) Patent No.: US 10,096,259 B2
(45) Date of Patent: Oct. 9, 2018

(54) VIDEO PLAYBACK DEVICE AND METHOD

(71) Applicant: FUJITSU LIMITED, Kawasaki-shi, Kanagawa (JP)

(72) Inventors: Atsushi Oguchi, Kawasaki (JP); Masahiro Kihara, Fukuoka (JP); Shunsuke Kobayashi, Fukuoka (JP); Kazumi Doi, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/214,856

(22) Filed: Jul. 20, 2016

(65) Prior Publication Data
US 2017/0025037 A1 Jan. 26, 2017

(30) Foreign Application Priority Data
Jul. 22, 2015 (JP) .................. 2015-145347

(51) Int. Cl.
| H04N 9/80 | (2006.01) |
| G09B 19/00 | (2006.01) |
| G11B 27/10 | (2006.01) |
| H04N 21/43 | (2011.01) |
| H04N 21/81 | (2011.01) |
| H04N 21/472 | (2011.01) |
| H04N 21/8547 | (2011.01) |
| G09B 5/06 | (2006.01) |

(52) U.S. Cl.
CPC ......... G09B 19/0038 (2013.01); G09B 5/065 (2013.01); G11B 27/10 (2013.01); H04N 21/4307 (2013.01); H04N 21/47217 (2013.01); H04N 21/8146 (2013.01); H04N 21/8547 (2013.01)

(58) Field of Classification Search
USPC ................................ 386/240, 248, 278, 282
See application file for complete search history.

(56) References Cited

U.S. PATENT DOCUMENTS

| 5,857,855 A | 1/1999 | Katayama |
| 5,947,742 A | 9/1999 | Katayama |
| 8,656,282 B2* | 2/2014 | Kulas ................. G06F 3/04842 715/723 |
| 2003/0177503 A1* | 9/2003 | Sull ................... G06F 17/30796 725/112 |
| 2004/0205087 A1* | 10/2004 | Dorsey ............. H04N 1/00408 |

(Continued)

FOREIGN PATENT DOCUMENTS

| JP | 7-144038 A | 6/1995 |
| KR | 10-2014-0050563 A | 4/2014 |

OTHER PUBLICATIONS

Office Action dated May 23, 2017, issued in Taiwanese Application No. 105122878, with English translation (10 pages).

(Continued)

*Primary Examiner* — Nigar Chowdhury
(74) *Attorney, Agent, or Firm* — Westerman, Hattori, Daniels & Adrian, LLP

(57) ABSTRACT

A video playback device includes a processor that executes a procedure. The procedure includes receiving a designation of a tuning during video playback in each of plural respective videos, and, according to a playback instruction, playing back the plural videos in synchronization starting from the timings designated for the plural respective videos.

9 Claims, 16 Drawing Sheets

(56) References Cited

U.S. PATENT DOCUMENTS

| | | | |
|---|---|---|---|
| 2008/0046956 A1* | 2/2008 | Kulas | H04N 21/4725 725/136 |
| 2009/0092374 A1* | 4/2009 | Kulas | H04N 7/173 386/248 |
| 2009/0150947 A1* | 6/2009 | Soderstrom | G06F 17/30817 725/93 |
| 2010/0278509 A1* | 11/2010 | Nagano | H04N 9/8227 386/230 |
| 2011/0013087 A1* | 1/2011 | House | A63B 24/0021 348/564 |
| 2015/0135068 A1* | 5/2015 | Chiu | G06F 3/0484 715/716 |

OTHER PUBLICATIONS

Office Action dated Mar. 2, 2018, issued in counterpart Korean Application No. 10-2016-0092832, with English translation. (7 pages).

Office Action dated Jun. 21, 2017, issued in Korean Application No. 10-2016-0092832, with English translation (15 pages).

* cited by examiner

FIG.2

| USERNAME | USER-DISTINCT SHARED INFORMATION NUMBER | PLAYLIST 1 | PLAYLIST 2 | TIMESTAMP OF PLAYLIST 1 | TIMESTAMP OF PLAYLIST 2 |
|---|---|---|---|---|---|
| USER A | 1 | PL001 | PL002 | t1 | t2 |
| ... | | | | | |

FIG.3

| TRANSMISSION SIDE USER | RECEPTION SIDE USER |
|---|---|
| USER A | USER B, USER C, ... |
| ... | |

FIG.4
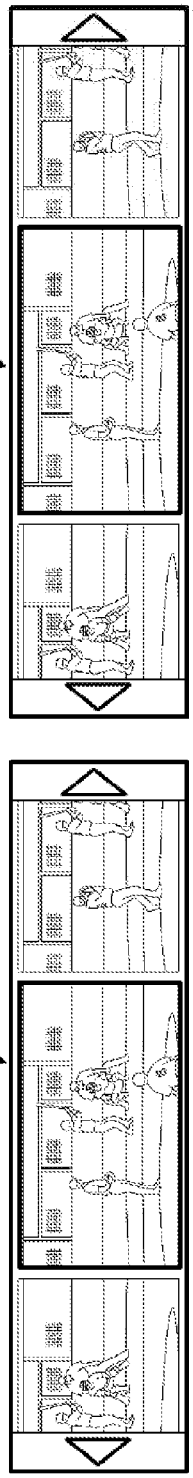
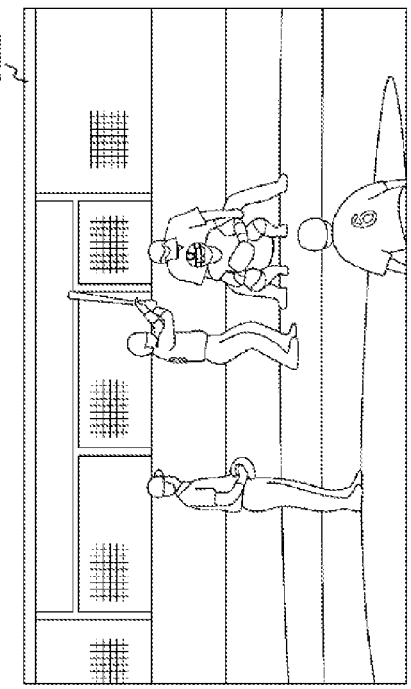
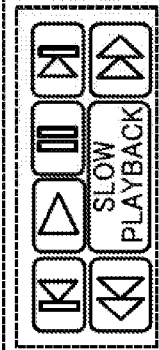

FIG.14

| USERNAME | USER-DISTINCT SHARED INFORMATION NUMBER | PLAYLIST 1 | PLAYLIST 2 | DRAW DATA 1 | DRAW DATA 2 | TIMESTAMP OF PLAYLIST 1 | TIMESTAMP OF PLAYLIST 2 | DISPLAY DURATION OF DRAW DATA 1 | DISPLAY DURATION OF DRAW DATA 2 |
|---|---|---|---|---|---|---|---|---|---|
| USER A | 1 | PL001 | PL002 | AAA.gif | BBB.gif | t1 | t2 | t3 TO t4 | t5 TO t6 |
| ... | | | | | | | | | |

232A

| USERNAME | USER-DISTINCT SHARED INFORMATION NUMBER | PLAYLIST | DRAWING DATA | DRAWING DISPLAY DURATION |
|---|---|---|---|---|
| USER A | 1 | PL001 | AAA.gif | t3 TO t4 |
| ... | | | | |

332A

VIDEO PLAYBACK DEVICE AND METHOD

CROSS-REFERENCE TO RELATED APPLICATION

This application is based upon and claims the benefit of priority of the prior Japanese Patent Application No. 2015-145347, filed on Jul. 22, 2015, the entire contents of which are incorporated herein by reference.

FIELD

The embodiments discussed herein are related to a storage medium storing a video playback program, a video playback device, and a video playback method.

BACKGROUND

Hitherto, instruction methods have been proposed for instruction on how to move the body in sports, performances, actions, or the like that are performed by moving the body. In such methods, a sport, performance, action or the like performed by a student under instruction is captured using a video camera, and instruction is given while comparing plural video images on a screen. Moreover, the sport, performance, action or the like as performed by an instructor is compared on the same screen, so as to give the student an understanding of the correct form and timing therefor.

RELATED PATENT DOCUMENTS

Japanese Laid-Open Patent Publication No. H07-144038

SUMMARY

According to an aspect of the embodiments, a video playback device includes a processor that executes a procedure. The procedure includes receiving a designation of a given timing during video playback in each of plural respective videos, and, according to a playback instruction, playing back the plural videos in synchronization starting from the timings designated for the plural respective videos.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a shared information table of the first exemplary embodiment;

FIG. 3 is a diagram illustrating an example of sharing user table;

FIG. 4 is a diagram illustrating an example of a video playback screen of the first exemplary embodiment;

FIG. 14 is a diagram illustrating an example of a shared information table of the second exemplary embodiment;

DESCRIPTION OF EMBODIMENTS

Detailed explanation follows regarding an exemplary embodiment according to technology disclosed herein, with reference to the drawings.

First Exemplary Embodiment

Figure 1:
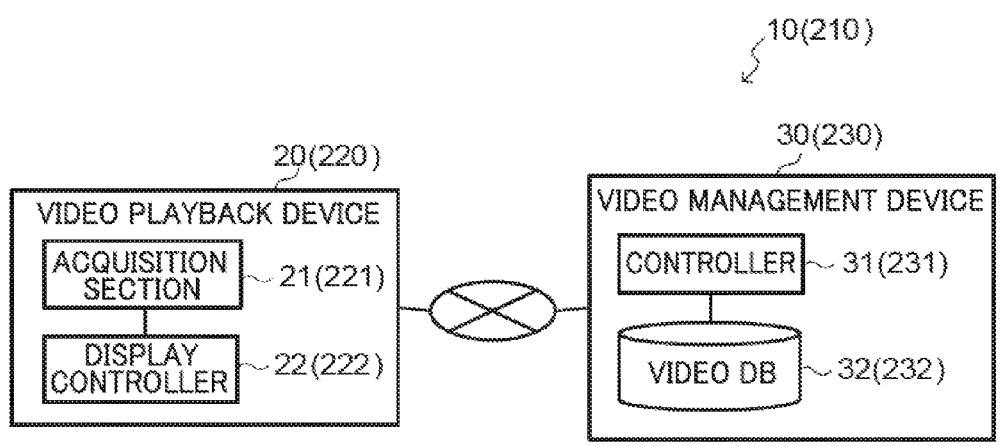
FIG. 1 is a block diagram illustrating a schematic configuration of a video playback system according to a first and a second exemplary embodiment.

As illustrated in FIG. 1. a video playback system 10 according to a first exemplary embodiment includes a video playback device 20 and a video management device 30. The video playback device 20 and the video management device 30 are connected to each other by network.

The video management device 30 includes a controller 31 that controls distribution and the like of video data to the video playback device 20, and a video database (DB) 32 that stores plural items of video data that can be provided to users. In the present exemplary embodiment, the video data is distributed to the video playback device 20 using a method in which split files obtained by splitting a single item of video data at specific time intervals (for example, 10 seconds) are sequentially distributed using hypertext transfer protocol (HTTP). This method is a method such as HTTP live streaming (HLS), or moving picture experts group—dynamic adaptive streaming over HTTP (MPEG-DASH). A playlist describing, for example, a playback sequence for the split files is therefore also stored in the video DB 32 for each item of video data. Management information for managing identification information (for example, usernames) of users to which each item of video data can be distributed is also stored in the video DB 32.

When a user logs in to a video playback application on the video playback device 20, the controller 31 receives identification information (for example, the username) of the logged-in user. The controller 31 transmits, to the video playback device 20, a playlist listing of video data items permitted for distribution to the logged-in user. The playlist listing is a listing of playlist names for respective video data permitted for distribution to the logged-in user, and in addition to the playlist names, the playlist listing may include metadata other than that of the video data, thumbnail images, and the like. Thumbnail images pre-generated from one of the frame images included in the video data may also be stored in the video DB 32, or the thumbnail images may be generated when transmitting the playlist When the controller 31 receives a request for video data from the video playback device 20, the controller 31 acquires the playlist corresponding to the requested video data from the video DB 32, and transmits the acquired playlist to the video playback device 20. Moreover, the controller 31 acquires, from the video DB 32, the split files sequentially requested by the video playback device 20 according to the playlist, and sequentially transmits the acquired split files to the video playback device 20.

The controller 31 manages shared information for sharing playback timings of videos between users. The shared information includes a username, two playlist names, and timestamps of respective playlists indicating synchronization points, and this is explained in more detail below. Hereafter, the user at the side registering the shared information to the video management device 30 is sometimes referred to as the "transmission side user", and the user at the side using the shared information managed by the video management device 30 to play back the videos is sometimes referred to as the "reception side user".

More specifically, the controller 31 receives the shared information transmitted from the video playback device 20 according to instruction by the transmission side user. The controller 31 manages received shared information held in, for example, a shared information table 32A like that illustrated in FIG. 2, in the video DB 32. In the example of FIG. 2, each row corresponds to one item of shared information. Moreover, "playlist 1" and "playlist 2" are two respective playlist names included in the shared information.

The controller 31 also manages the shared information for each transmission side user. When shared information is registered in the shared information table 32A, the controller 31 allocates, to each item of shared information, a number for identifying the item of shared information for each username as a "user-distinct shared information number".

As illustrated in FIG. 3, for each user, shared information transmitted by that user when they are the transmission side user is also stored in a sharing user table 32B in the video DB 32 in association with identification information (for example, usernames) of users that are capable of using the shared information as reception side users. The sharing user table 32B may be preregistered when application use is registered, and usernames of users capable of using the shared information may be included in the shared information and registered when the shared information has been received by the controller 31.

When shared information usable by a logged-in user is present, the controller 31 notifies this to the video playback device 20. More specifically, the controller 31 references the sharing user table 32B, searches the "reception side user" column for usernames of logged-in users, and acquires the usernames of corresponding transmission side users. In cases in which shared information being managed in association with an acquired username is present in the shared information table 32A, the controller 31 then determines that shared information usable by a logged-in user is present in the shared information table 32A.

Moreover, when the controller 31 has received a request for a share list (described in detail below) from the video playback device 20, the controller 31 acquires shared information usable by the logged-in user from the shared information table 32A, and transmits a share list listing the acquired shared information to the video playback device 20. At least the usernames and the user-distinct shared information numbers for each item of shared information are included in the share list. Other than the above information included in the shared information, metadata, a thumbnail image, and the like of video data indicated by the playlist name included in each item of shared information may also be included in the shared information.

Moreover, when the controller 31 has received a request for a shared video from the video playback device 20, the controller 31 acquires shared information for the requested video, and the two playlists respectively indicated by the two playlist names included in the shared information, from the video DB 32. The controller 31 then transmits the acquired shared information and playlists to the video playback device 20.

The video playback device 20 functions as a display section that displays a video playback screen 60 (described in detail below), and as a video playback application that is installed to a user terminal provided with an input section for input of information. The user terminal is, for example, an information processing device such as a personal computer (PC), a notebook PC, a tablet terminal, or a smartphone.

As illustrated in FIG. 1, the video playback device 20 functionally includes an acquisition section 21 and a display controller 22. The display controller 22 is an example of a reception section and a playback controller of technology disclosed herein.

The acquisition section 21 transmits the identification information (for example, the username) of the logged-in user to the video management device 30, and thereby acquires, from the video management device 30, the playlist listing of the video data permitted for distribution to the logged-in user, and passes the acquired playlist listing to the display controller 22. Moreover, the acquisition section 21 transmits, to the video management device 30, the playlist names for videos that have been selected from the playlist listing by the user, and thereby requests video data from the video management device 30, and acquires the playlist corresponding to that video data. Moreover, the acquisition section 21 issues sequential requests to the video management device 30 for split files in accordance with the acquired playlist, and sequentially acquires the split file from the video management device 30. The acquisition section 21 sequentially passes the acquired split file to the display controller 22.

Moreover, the acquisition section 21 transmits the shared information to the video management device 30 due to instruction by the transmission side user.

The acquisition section 21 also acquires video data shared from the video management device 30, according to instruction by the reception side user, More specifically, when a user has logged-in, in cases in which a notification has been received from the video management device 330 stating that shared information usable by the logged-in user is present, the acquisition section 21 notifies this to the display controller 22. Moreover, when a notification (described in detail below) has been made from the display controller 22 stating that a display share list button has been selected, the acquisition section 21 requests a share list from the video management device 30. The acquisition section 21 also passes the share list received corresponding to the request to the display controller 22. Moreover, when the display controller 22 has notified the acquisition section 21 of a user-name and a user-distinct shared information number of shared information selected from the share list (this is described in more detail Mow), the acquisition section 21 requests the shared video by transmitting the username and the user-distinct shared information number to the video management device 30. The acquisition section 21 then acquires the Shared information and the playlist received corresponding to the request, sequentially acquires the split tiles from the video management device 30 according to the playlist, and passes the acquired split files to the display controller 22 together with the shared information.

When the display controller 22 receives the playlist listing from the acquisition section 21, the display controller 22, for example, displays a video playback screen 60 like that illustrated in FIG. 4 on the display section. In the example of FIG. 4, plural videos can be played back in a video playback region 61 provided in the center of the video playback screen 60. Note that in the present exemplary embodiment, explanation is given regarding an example of a case in which two videos are played back. The video at the left side of the video playback screen 60 is referred to as a left video 62L and the video at the right side of the video playback screen 60 is referred to as a right video 62R. In states in which desired videos have not yet been selected from the playlist listing, neither a left video 62L nor a right video 62R is displayed on the video playback region 61.

The display controller 22 displays, in a specific region of the video playback screen 60, a left video playlist listing 63L for selecting the left video 62L to play back, and a right video playlist listing 63R for selecting the right video 62R to play back. FIG. 2 illustrates an example in which thumbnail images of the videos represented by the respective playlists are displayed as the respective playlist listings 63L, 63R. The display controller 22 displays the respective playlist listings 63L, 63R in a state in which all of the thumbnail images can be checked by scrolling or the like. The display state of the playlist listing is not limited to cases employing thumbnail images as illustrated in FIG. 2. Playlist names included in the playlist listing may be displayed in a listing, or playlist names may be displayed together with the thumbnail images. When other metadata is also included in the playlist listing acquired from the video management device 30, that metadata may also be displayed together with the playlist listing.

When thumbnail images have been selected by operations such as double clicks or double taps that respectively correspond to the left video playlist listing 63L and the right video playlist listing 63R, the display controller 22 emphatically displays the selected thumbnails images. As the emphatic display, the display controller 22 can control display such that, for example, a border is thickened, size is increased, or brightness is increased. Moreover, the display controller 22 notifies the acquisition section 21 of the play-list name corresponding to the thumbnail image selected from the left video playlist listing 63L, and the playlist name corresponding to the thumbnail image selected from the right video playlist listing 63R.

Moreover, wren the display controller 22 receives the split file from the acquisition section 21, the video corresponding to the thumbnail image that was selected from the left video playlist listing 63L is displayed in the video playback region 61 as the left video 62L. Moreover, the video corresponding to the thumbnail image that was selected from the right video playlist listing 63R is displayed in the video playback region 61 as the right video 62R.

In general methods for streaming playback of video using hypertext markup language (HTML), the position and size of a region where a video is to be played back is set in advance. In the present exemplary embodiment, control information regarding the display sizes and display positions of the respective left video 62L and the right video 62R is awaited, and the display controller 22 uses the control information to respectively dispose the left video 62L and the right video 62R at freely selected positions and at freely selected sizes in the video playback region 61. The display size, which is control information, is, for example, information respectively designating the widths and heights for the left video 62L and the right video 62R. The display position, which is control information, is information respectively designating x-coordinates and y-coordinates of freely selected points (for example, the top left corners) of the left video 62L and the right video 62R. Note that the x-coordinate and the y-coordinate may employ coordinate values of a coordinate system in which the rightward direction is set as the positive direction of the x-axis, and the downward direction is set as the positive direction of the y-axis, with the top left corner of the video playback region 61 serving as the origin.

Thus, disposing the videos with freely selected display positions and display sizes can be realized using a combination of frameworks each capable of implementing precise functionality, rather than using a large, easy to handle framework such as that of a media player. For example, the functionality described above can be implemented using a combination of a framework for displaying videos and a framework that detects operations such as touches, and the like. For example, the AVPlayer, AVPlayerItem layer of AVfoundation, which is a framework related to audio, can be employed as a framework for displaying videos on iOS (registered trademark).

The display controller 22 also displays a left video operation button group 64L for controlling playback of the left video 62L, and a right video operation button group 64R for controlling playback of the right video 62R, in specific regions of the video playback screen 60. The display controller 22 also displays a shared operation button group 64C for simultaneously controlling playback of the left video 62L and playback of the right video 62R. As operation buttons, each of the respective operation button groups 64L, 64C, 64R includes, for example, a rewind button, a play button, a pause button, a fast forward button, a previous-frame button, a slow playback button, a pause button, and a next-frame button.

When an operation button of the left video operation button group 64L has been operated by the user, the display controller 22 controls playback of the left video 62L based on the button operated and the amount of operation. Moreover, when an operation button of the right video operation button group 64R has been operated by the user, the display controller 22 controls playback of the right video 62R based on the button operated and the amount of operation. Moreover, when an operation button of the shared operation button group 64C has been operated by the user, the display controller 22 controls playback of both the left video 62L and the right video 62R based on the button operated and the amount of operation.

The display controller 22 also displays a left video synchronization point button 65L for designating any timing of the left video 62L during playback in a specific region of the video playback screen 60. Similarly, the display controller 22 displays a right video synchronization point button 65R for designating any timing of the right video 62R during playback in the video playback screen 60. The display controller 22 receives the timing selected by the left video synchronization point button 65L as a synchronization point for the left video 62L, and receives the timing selected by the right video synchronization point button 65R as a synchronization point for the right video 62R.

More specifically, while the respective videos 62L, 62R are played back, the display controller 22 acquires, as the synchronization point, information for specifying respective frame images of the videos 62L, 62R displayed when the respective synchronization point buttons 65L, 65R were selected, and holds the acquired information. The information for specifying frame images is, for example, timestamps indicating playback times of the videos, or frame numbers allocated to the respective frames. In the present exemplary embodiment, explanation follows regarding an example of a case in which timestamps are employed as the information for specifying frame images. Moreover, when the left video synchronization point button 65L or the right video synchronization point button 65R has again been selected in a state in which a synchronization point is currently held for the left video 62L or the right video 62R, the display controller 22 discards the information related to the currently held synchronization point.

When a play button included in any of the operation button groups 64L, 64R, 64C has been selected in a state in which synchronization points are held for both of the videos 62L, 62R, the display controller 22 plays back both of the videos 62L, 62R in synchronization with each other, starting from the synchronization point. More specifically, the display controller 22 simultaneously plays back the videos 62L, 62R starting from the frame images indicated by the synchronization points of both of the videos 62L, 62R, or from frame images corresponding to timings at specific amounts of time prior to the timings indicated by the synchronization points. Namely, the videos 62L, 62R are both played back such that playback timings of frame images of both of the videos 62L, 62R indicated by the synchronization points are caused to match.

The display controller 22 can acquire synchronization points for both of the videos 62L, 62R, not only in cases in which the respective synchronization point buttons 65L, 65R have been selected, but also in the following case. Specifically, the user pauses the left video 62L at a desired timing, and selects the play button of the shared operation button group 64C in a state in which a frame image of the right video 62R to be aligned with the timing of the frame image that was paused at has been found and displayed by frame-by-frame advancing or the like. This enables synchronized playback to be realized with the playback timings of desired frame images caused to match. In such cases, the display controller 22 can acquire, as the synchronization point, the timestamps of the frame images of the respective videos 62L, 62R that were being displayed when the play button of the shared operation button group 64C was selected.

The display controller 22 also displays the share button 71 in a specific region of the video playback screen 60. When the share button 71 has been selected, the display controller 22 respectively acquires, from the playlist listing, the playlist names of the left video 62L and the right video 62R during playback. The display controller 22 appends the identification information (for example, the username) of the logged-in user to the acquired playlist name and the timestamp indicated by the currently held synchronization points of the respective videos 62L, 62R, and passes this to the acquisition section 21 as shared information. In the present exemplary embodiment, in the shared information table 32A of the video DB 32 described above, the playlist of the left video 62L is stored as playlist 1, and the playlist of the right video 62R is stored as playlist 2. However, there is no need to specify that playlist 1 or playlist 2 corresponds to either the left video 62L or the right video 62R if information related to the display position and display size of the respective videos 62L, 62R is also included in the shared information.

Figure 5:
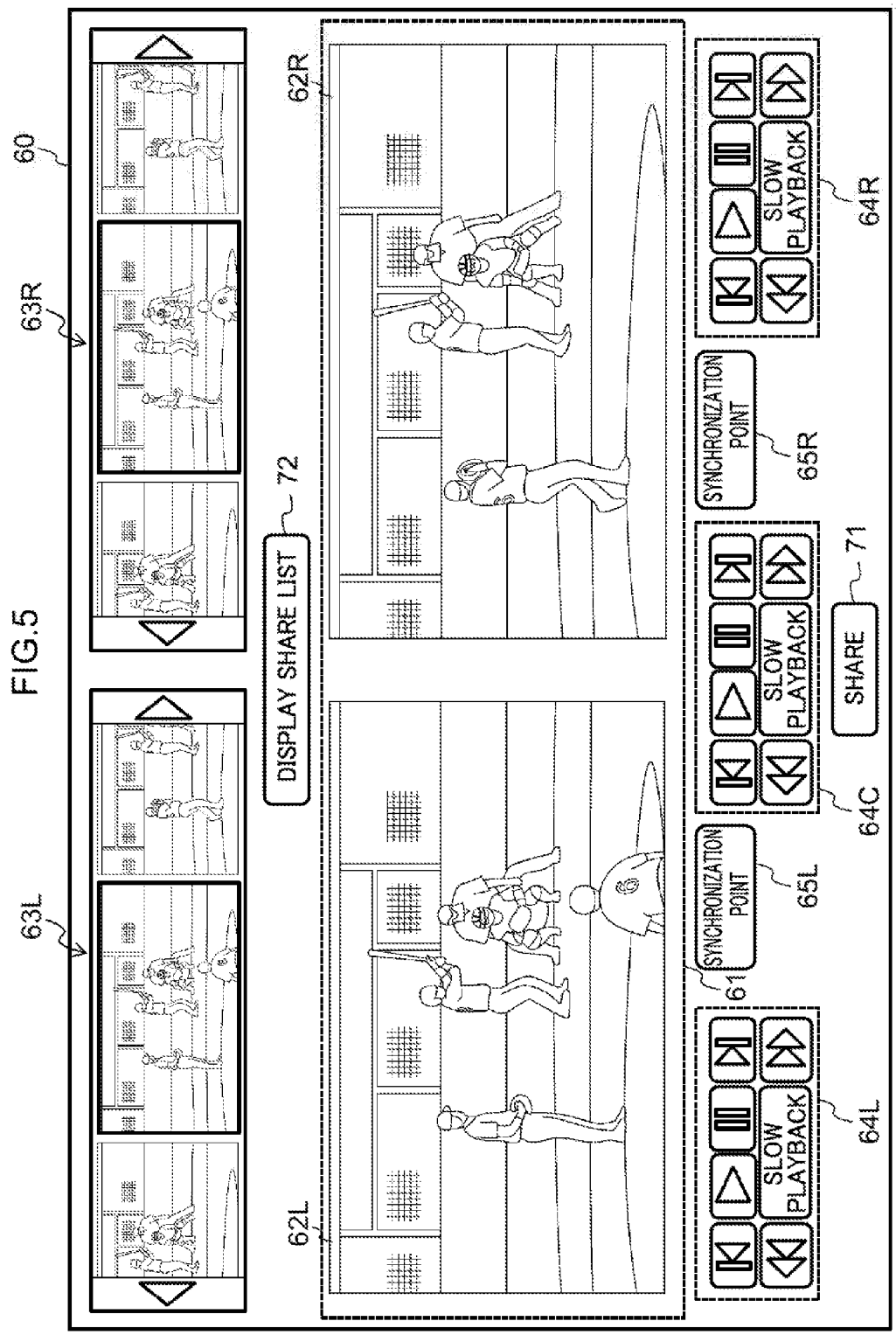
FIG. 5 is a diagram illustrating an example of a video playback screen with a display share list button displayed.

Moreover, when the display controller 22 has been notified by the acquisition section 21 that shared information usable by the logged-in user is present, the display controller 22 displays the display share list button 72 on the video playback screen 360, as illustrated in FIG. 5, When the display share list button 72 has been selected, the display controller 22 notifies this to the acquisition section 21.

Figure 6:
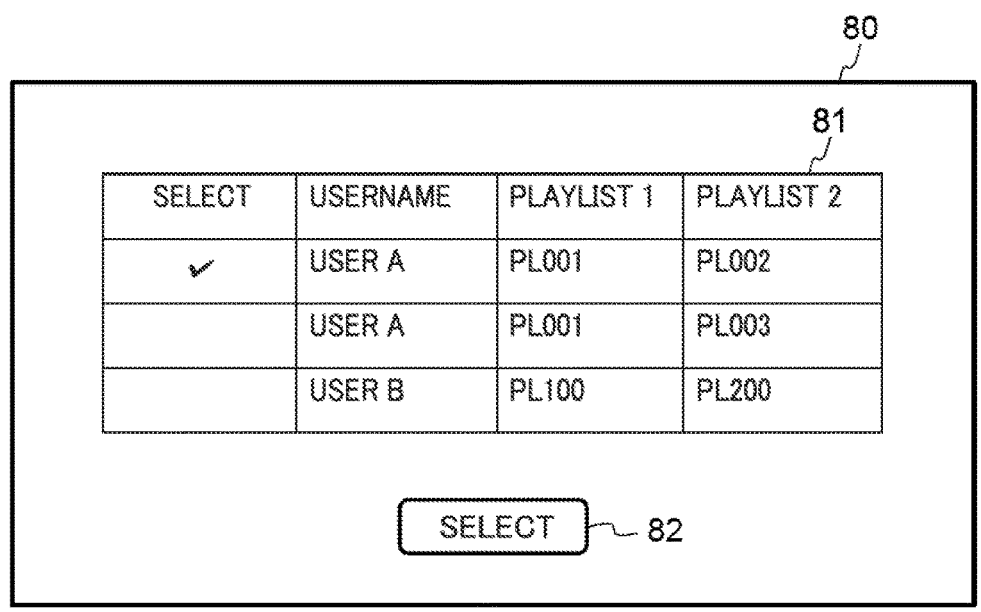
FIG. 6 is a diagram illustrating an example of a share list screen.

When the display controller 22 has received the share list from the acquisition section 21, the display controller 22 also displays, for example, a share list screen 80 like that illustrated in FIG. 6. The share list screen 80 may be displayed by switching from video playback screen 60, or may be displayed superimposed over the video playback screen 60. In the example of FIG. 6, the share list screen 80 includes a share list 81 and a select button 82. Each row of the share list 81 corresponds to one item of shared information and each row is displayed in a selectable state. Moreover, each row of the share list 81 is linked to at least a username and a user-distinct shared information number, and selecting at least one row from the share list 81 causes the shared information specified by the username and user-distinct shared information number linked to that row to be selected. In the example of FIG. 6, a case is illustrated in which the items included in the share list 81 are the username, playlist 1, and playlist 2; however, there is no limitation thereto. In cases in which metadata, a thumbnail image, and the like of the video data indicated by each playlist name is included in the share list acquired from the video management device 30, this information may also be displayed.

When the select button 82 has been selected in a state in which at least one row has been selected from the share list 81, the display controller 22 notifies, to the acquisition section 21, the username and the user-distinct shared information number linked to the row selected in the share list 81. The display controller 22 also closes the share list screen 80 and returns to displaying the video playback screen 60.

Moreover, when the display controller 22 has received the shared information together with the split files from the acquisition section 21, the display controller 22 controls the playback timing at which the videos represented by the split files are sequentially played back, in accordance with the timestamps indicating the synchronization points included in the shared information. For example, suppose the display controller 22 has received the shared information in the first row of the shared information table 32A illustrated in FIG. 2. In such a case, the display controller 22 sequentially plays back the video represented by the split files acquired according to the playlist 1 as the left video 62L, and sequentially plays back the video represented by the split files acquired according to the playlist 2 as the right video 62R. When this is performed. the display controller 22 plays back the left video 62L and the right video 62R in synchronization, starting from the tuning of timestamp t1 of the left video 62L and the timing of timestamp t2 of the right video 62R. Namely, the display controller 22 controls playback timings of both of the videos 62L, 62R such that the frame image specified by the timestamp t1 of the left video 62L and the frame image specified by the timestamp t2 of the right video 62R are displayed at the me timing.

Figure 7:
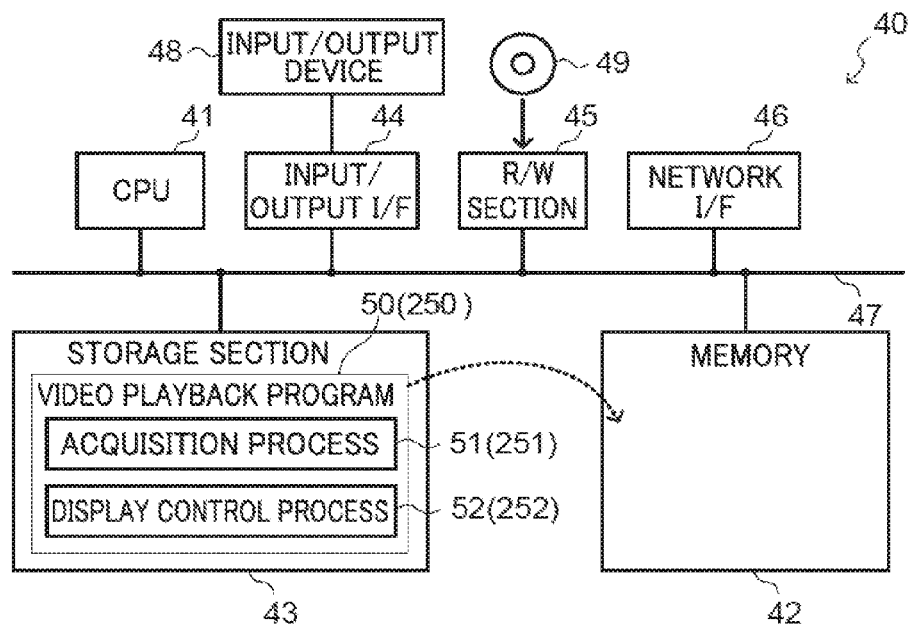
FIG. 7 is a block diagram illustrating a schematic configuration of a computer that functions as a video playback device according to the first and the second exemplary embodiments.

The video playback device 20 may, for example, be implemented by the computer 40 illustrated in FIG. 7. The computer 40 includes a CPU 41, memory 42 serving as a temporary storage region, and a non-volatile storage section 43. The computer 40 also includes an input/output interface (I/F) 44 to which input/output devices 48, such as a display device and an input device, are connected. The computer 40 also includes a read/write (R/W) section 45 for controlling reading and writing of data from and to a recording medium 49, and a network I/F 46 connected to a network such as the internet. The CPU 41, the memory 42, the storage section 43, the input/output I/F 44, the R/W section 45, and the network I/F 46 are connected to one another through a bus 47.

The storage section 43 may be implemented by a hard disk drive (HDD), a solid state drive (SSD), flash memory, or the like. A video playback program 50 that causes the computer 40 to function as the video playback device 20 is stored in the storage section 43, which serves as a storage medium. The video playback program 50 includes an acquisition process 51 and a display control process 52.

The CPU 41 reads the video playback prop-am 50 from the storage section 43, expands the video playback program 50 into the memory 42, and sequentially executes the processes included in the video playback program 50. The CPU 41 operates as the acquisition section 21 illustrated in FIG. 1 by executing the acquisition process 51. The CPU 41 also operates as the display controller 22 illustrated in FIG. 1 by executing the display control process 52. The computer 40, which executes the video playback program 50, thereby functions as the video playback device 20.

The functionality implemented by the video playback program 50 can also be implemented by, for example, a semiconductor integrated circuit, and more specifically, by an application specific integrated circuit (ASIC).

Next, explanation follows regarding operation of the video playback system 10 according to the first exemplary embodiment.

In the video playback device 20, when the user has logged-in to the video playback application, the acquisition section 21 transmits the identification information (for example, the username) of the logged-in user to the video management device 30.

In the video management device 30, when the user identification information has been received, the controller 31 transmits, to the video playback device 20, a playlist listing of video data permitted for distribution to the logged-in user.

In the video playback device 20, the acquisition section 21 passes the acquired playlist listing to the display controller 22. The display controller 22, for example, displays a video playback screen 60 like that illustrated in FIG. 2 (the left video 62L and the right video 62R are not displayed).

When respective thumbnail images have been selected by the user from the left video playlist listing 63L and the right video playlist listing 63R, the display controller 22 emphatically displays the selected thumbnail images. The display controller 22 then notifies, to the acquisition section 21, the playlist name corresponding to the thumbnail image selected from the left video playlist listing 63L, and the playlist name corresponding to the thumbnail image selected from the right video playlist listing 63R. The acquisition section 21 then requests video data from the video management device 30 by transmitting the playlist names indicated by the respectively notified left video 62L and right video 62R to the video management device 30.

In the video management device 30, the controller 31 acquires the playlist corresponding to the requested video data from the video DB 32, and transmits the acquired playlist to the video playback device 20.

In the video playback device 20, the acquisition section 21 acquires the playlist, and sequentially requests the split files from the video management device 30 in accordance with the acquired playlist.

In the video management device 30, the controller 31 acquires the requested split files from the video DB 32, and sequentially transmits the acquired split files to the video playback device 20.

In the video playback device 20, the acquisition section 21 sequentially passes the acquired split files to the display controller 22. Then, when the display controller 22 has received the split files from the acquisition section 21, the display controller 22 plays back the left video 62L and the right video 62R in the video playback region 61. The respective display sizes and display positions of the left video 62L and right video 62R are defined by preset values in the control information respectively held for the left video 62L and the right video 62R. The display controller 22 then respectively controls playback of the left video 62L and the right video 62R based on operation of the operation buttons of the respective operation button groups 64L, 64C, 64R by the user.

Figure 8:
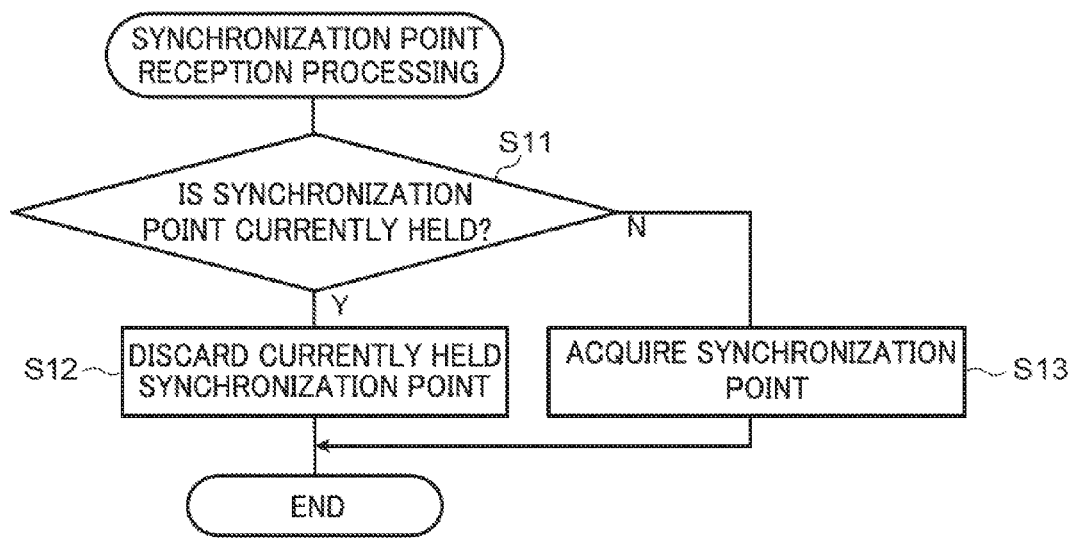
FIG. 8 is a flowchart illustrating an example of synchronization point reception processing.

Then, when the left video synchronization point button 65L has been selected during playback of the left video 62L, or the right video synchronization point button 65R has been selected during playback of the right video 62R, the synchronization point reception processing illustrated in FIG. 8 is executed in the video playback device 20.

At step S11 of the synchronization point reception processing illustrated in FIG. 8, the display controller 22 determines whether or not a synchronization point is currently held in the specific storage region for the left video 62L or the right video 62R corresponding to the selected synchronization point button 65L or 65R. In cases in which a synchronization point is currently held, processing transitions to step S12, the display controller 22 discards the currently held synchronization point information, and the synchronization point reception processing ends. However, processing transitions to step 513 in cases in which no synchronization point is held.

At step S13, in cases in which the left video synchronization point button 65L has been selected, the display controller 22 acquires times tamp information corresponding to the frame image of the left video 62L that was displayed when the left video synchronization point button 65L was selected. Moreover in cases in which the right video synchronization point button 65R has been selected, the display controller 22 acquires the timestamp information corresponding to the frame image of the right video 62R that was displayed when the right video synchronization point button 65R was selected. Then, the display controller 22 stores the acquired timestamp information in the specific storage region, and the synchronization point reception processing ends.

Suppose that the play button included in any of the operation button groups 64L, 64R, 64C has been selected in a state in which synchronization points are held for both of the videos 62L, 62R according to the synchronization point reception processing above. In such cases, the display controller 22 performs plays back both of the videos 62L, 62R in synchronization, starting from the synchronization points of both of the videos 62L, 62R.

Next, explanation follows regarding processing for sharing synchronization points of videos between users. After first explaining a flow of processing for exchanges between a video playback device 20A operated by the transmission side user, the video management device 30, and a video playback device 20B operated by the reception side user, explanation follows regarding details of processing executed by each of these devices. Note that it is convenient to treat the video playback device 20A and the video playback device 20B as being distinct for the sake of explaining differences in behavior between the transmission of shared information and the use of shared information, but this does not imply that these devices are configured differently from each other.

Figure 9:
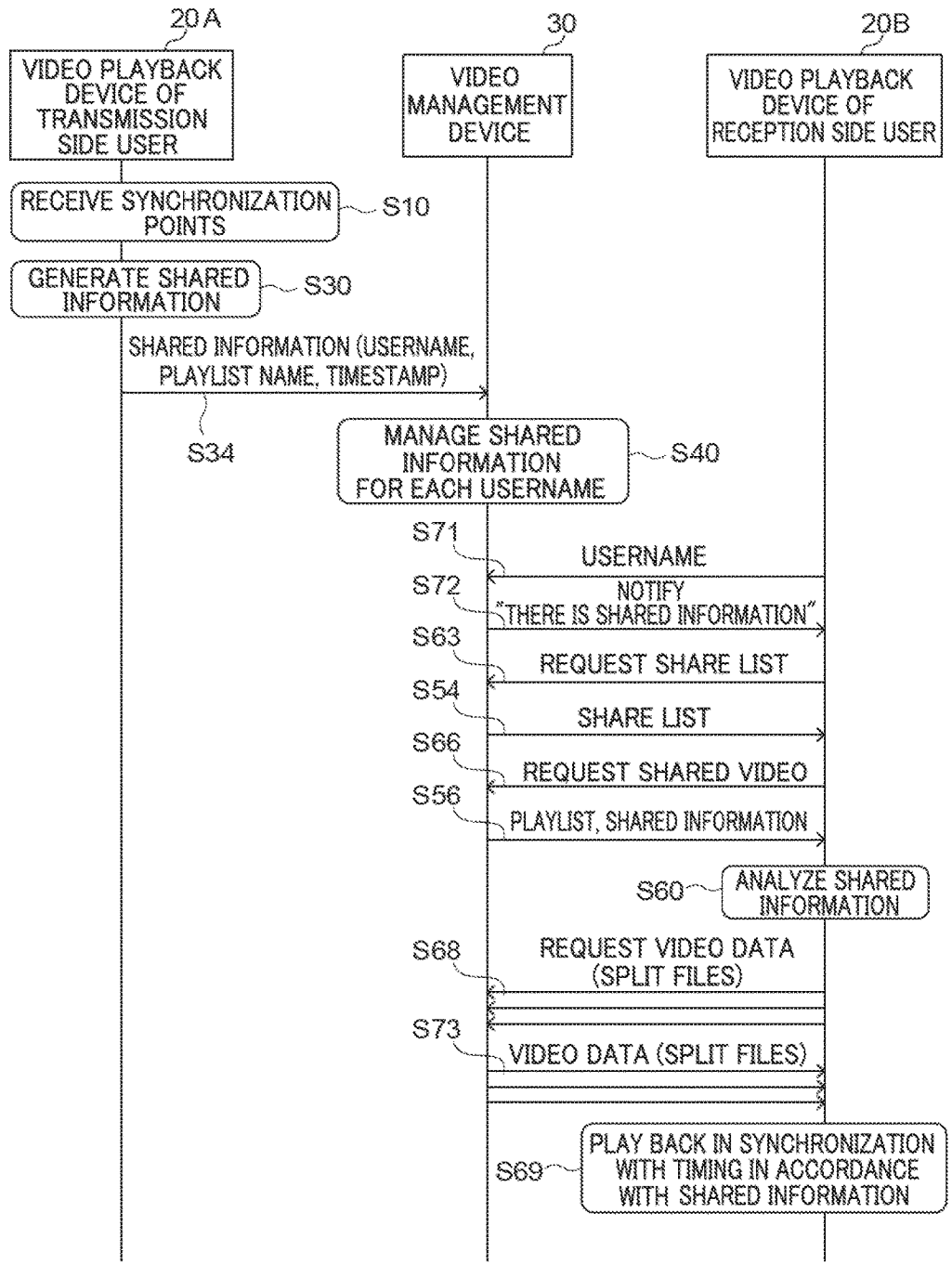
FIG. 9 is a sequence diagram representing a flow of processing for exchange between a transmission side user video playback device, a video management device, and a reception side user video playback device.

FIG. 9 illustrates a sequence diagram representing a flow of processing for exchanges between the video playback device 20A, the video management device 30, and the video playback device 20B. The synchronization point reception processing (FIG. 8) is executed in the video playback device 20A (S10). Then, when the share button 71 has been selected from the video playback screen 60, the display controller 22 generates shared information (S30) and transmits the shared information to the video management device 30 (S34). The received shared information Is managed in the video management device 30 (S40).

Due to a user logging in to the video playback device 20B, the username of the logged-in user is transmitted from the video playback device 20B to the video management device 30 (S71). In cases in which shared information usable by the logged-in user is present, the video management device 30 notifies this to the video playback device 20B (S72). When this notification has been received and the share list has been requested by the video playback device 20B (S63), the share list is transmitted from the video management device 30 (S54). The video playback device 20B then makes a request to the video management device 30 for the shared video (S66). The video management device 30 transmits, to the video playback device 20B, shared information for the requested video and the playlists indicated by the playlist names included in the shared information (S56).

In the video playback device 20B, the acquired shared information is analyzed, and the username, the respective playlist names, and timestamp information of the respective playlists are extracted. The video playback device 20B also makes sequential requests to the video management device 30 for split files in accordance with the acquired playlist (S68). The video management device 30 sequentially transmits the split files to the video playback device 20B in accordance with the request (S73). In the video playback device 20B, synchronized playback of the video represented by the sequentially acquired split files is performed starting from the timings of the timestamps of the respective playlists included in the shared information (S69).

Explanation follows regarding processing executed by the video playback device 20A, the video management device 30, and the video playback device 20B, respectively. In each processing, steps that perform processing similar to processing explained with reference to FIG. 9 are allocated the same reference numerals.

Figure 10:
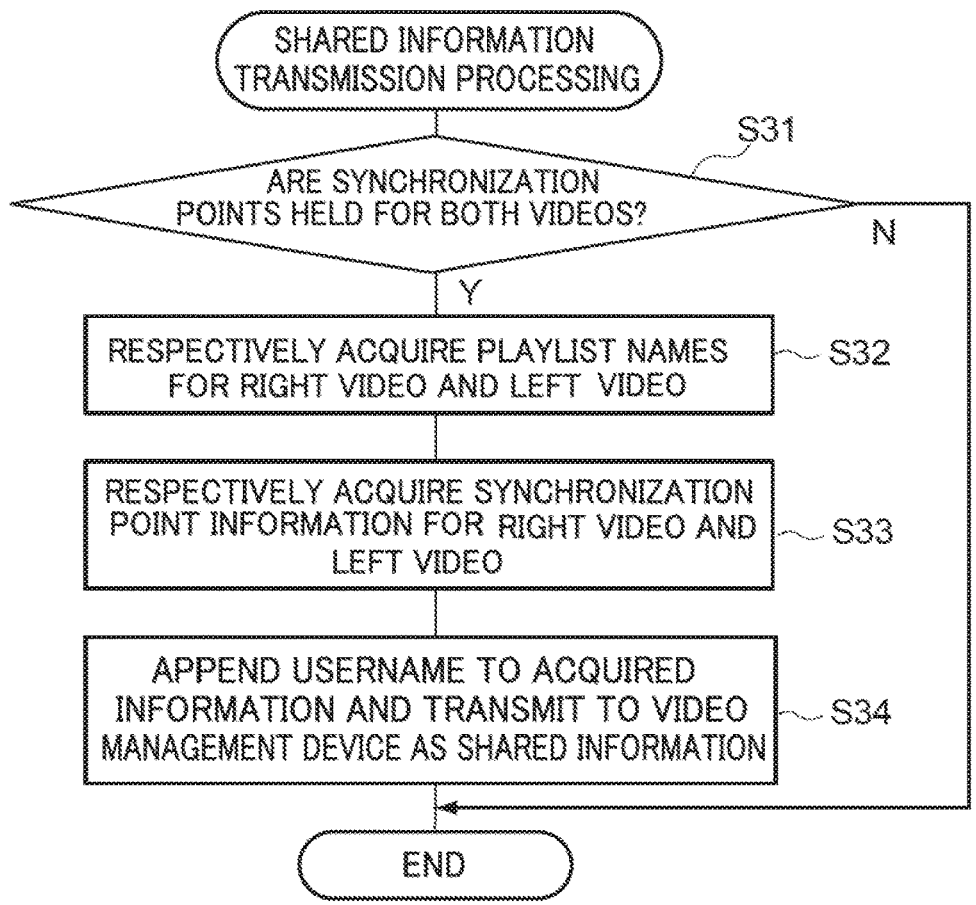
FIG. 10 is a flowchart illustrating an example of shared information transmission processing.

First, in the video playback device 20A, when the share button 71 displayed by the video playback screen 60 has been selected, the shared information transmission processing illustrated in FIG. 10 is executed.

At step S31, the display controller 22 determines whether or not the synchronization point for the left video 62L and the synchronization point for the right video 62R are both currently held in the specific storage region. Processing transitions to step S32 in cases in which both are currently held, or the shared information transmission processing ends in cases in which there is at least one video for which no synchronization point is held.

At step S32, the display controller 22 respectively acquires the playlist names for the left video 62L and the right video 62R during playback, from the playlist listing received from the acquisition section 21. Next, at step S33, the display controller 22 acquires formation regarding the respective timestamps indicating the synchronization points of the left video 62L and the right video 62R from a specific storage region. Next, at step S34, the display controller 22 appends the identification information of the logged-in user (for example, their username) to the two acquired playlist names and the acquired information related to the timestamps, and this is passed to the acquisition section 21 as the shared information. The acquisition section 21 then transmits the shared information to the video management device 30 and then ends the shared information transmission processing.

Figure 11:
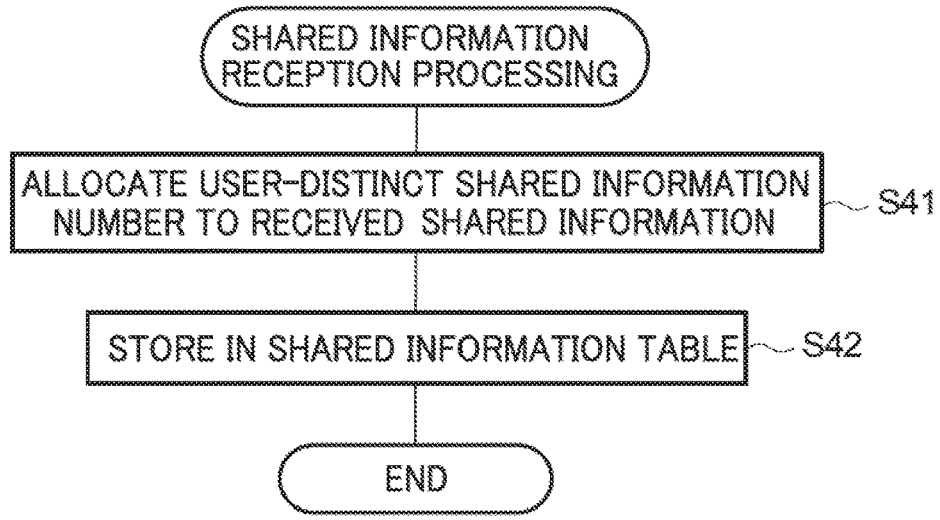
FIG. 11 is a flowchart illustrating an example of shared information reception processing.

Next, in the video management device 330, when the shared information transmitted from the video playback device 20A has been received, the shared information reception processing illustrated in FIG. 11 is executed.

At step S41, the controller 31 allocates a user-distinct shared information number to the received shared information. Next, at step S42, the controller 31 stores the shared information allocated with the user-distinct shared information number in the shared information table 32A of the video DB 32, and then ends the shared information reception processing.

Figure 12:
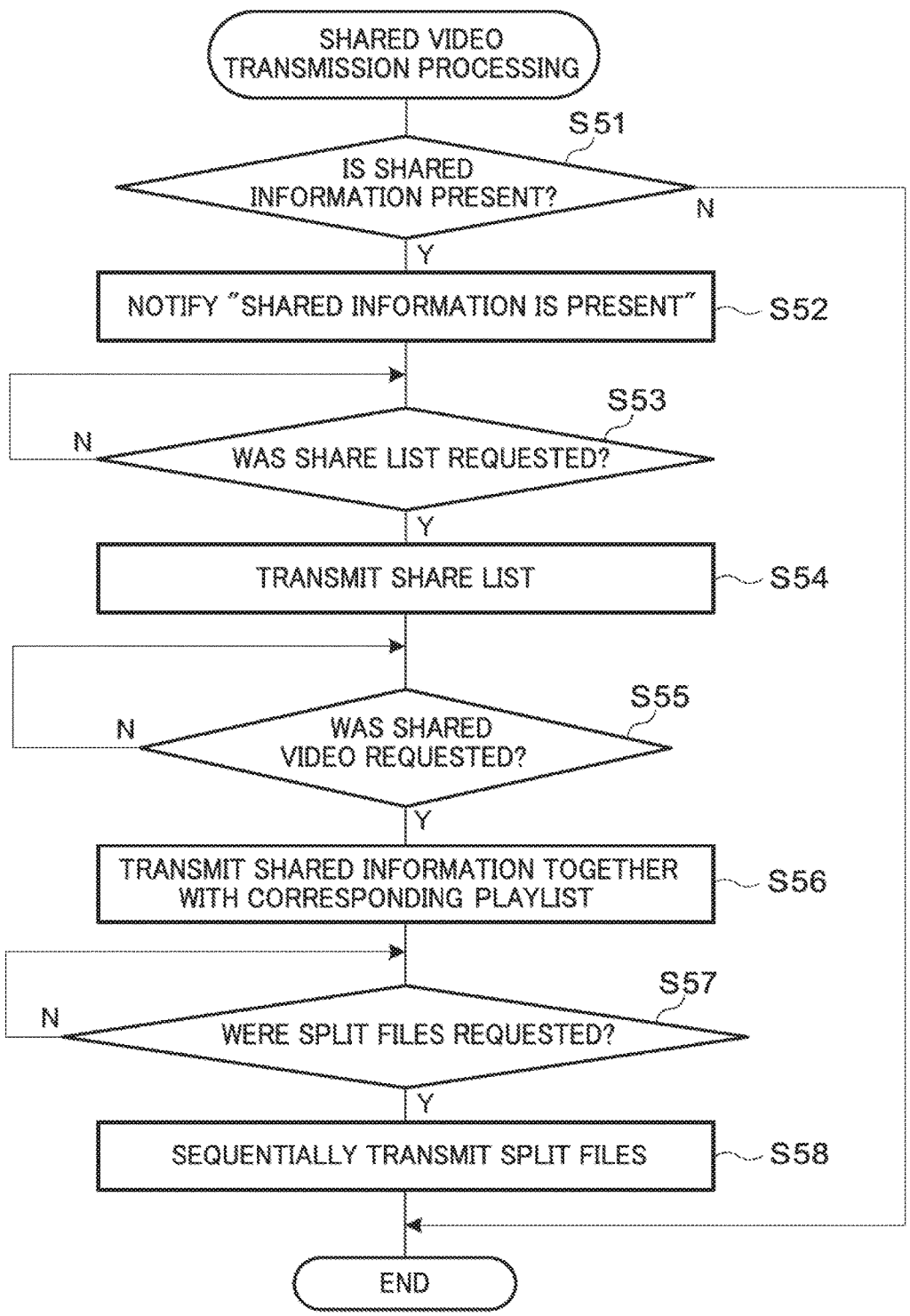
FIG. 12 is a flowchart illustrating an example of shared video transmission processing.

Moreover, in the video playback device 20B, when a username transmitted from the video playback device 20B due to a user logging in has been received by the video management device 30, the shared video transmission processing illustrated in FIG. 12 is executed by the video management device 30.

At step S51, the controller 31 references the sharing user table 32B and the shared information table 32A of the video DB 32, and determines whether or not shared information usable by the logged-in user is present. In cases in which shared information usable by the logged-in user is present, processing transitions to step S52, and the video playback device 20B is notified that shared information usable by the logged-in user is present. However, in cases in which no shared information usable by the logged-in user is present, the shared video transmission processing ends.

Next, at step S53, the controller 31 determines whether or not a request for a share list from the video playback device 20B has been received. Processing transitions to step S54 in cases in which a request for a share list has been received, or the determination of the current step is repeated in cases in which a request for a share list has not been received, At step S54, the controller 31 acquires shared information usable by the logged-in user from the shared information table 32A, and transmits the share list listing the acquired shared information to the video playback device 20B, Next, at step S55, the controller 331 determines whether or not a request from the video playback device 2013 for shared videos has been received. Processing transitions to step S56 in cases in which a request for shared videos has been received, or the determination of the current step is repeated in cases in which a request for shared videos has not been received.

At step S56, the controller 31 acquires, from the video DB 32, shared information for the requested videos and the two playlists respectively indicated by the two playlist names included in the shared information, and transmits these to the video playback device 20B.

Next, at step S57, the controller 31 determines whether or not a request from the video playback device 20B for split files has been received. Processing transitions to step S58 in cases in which a request for split files has been received, or the determination of the current step is repeated in cases in which a request for split files has not been received.

At step S58, the controller 31 acquires the requested split files from the video DB 32, sequentially transmits the acquired split files to the video playback device 20B, and then the shared video transmission processing ends.

Figure 13:
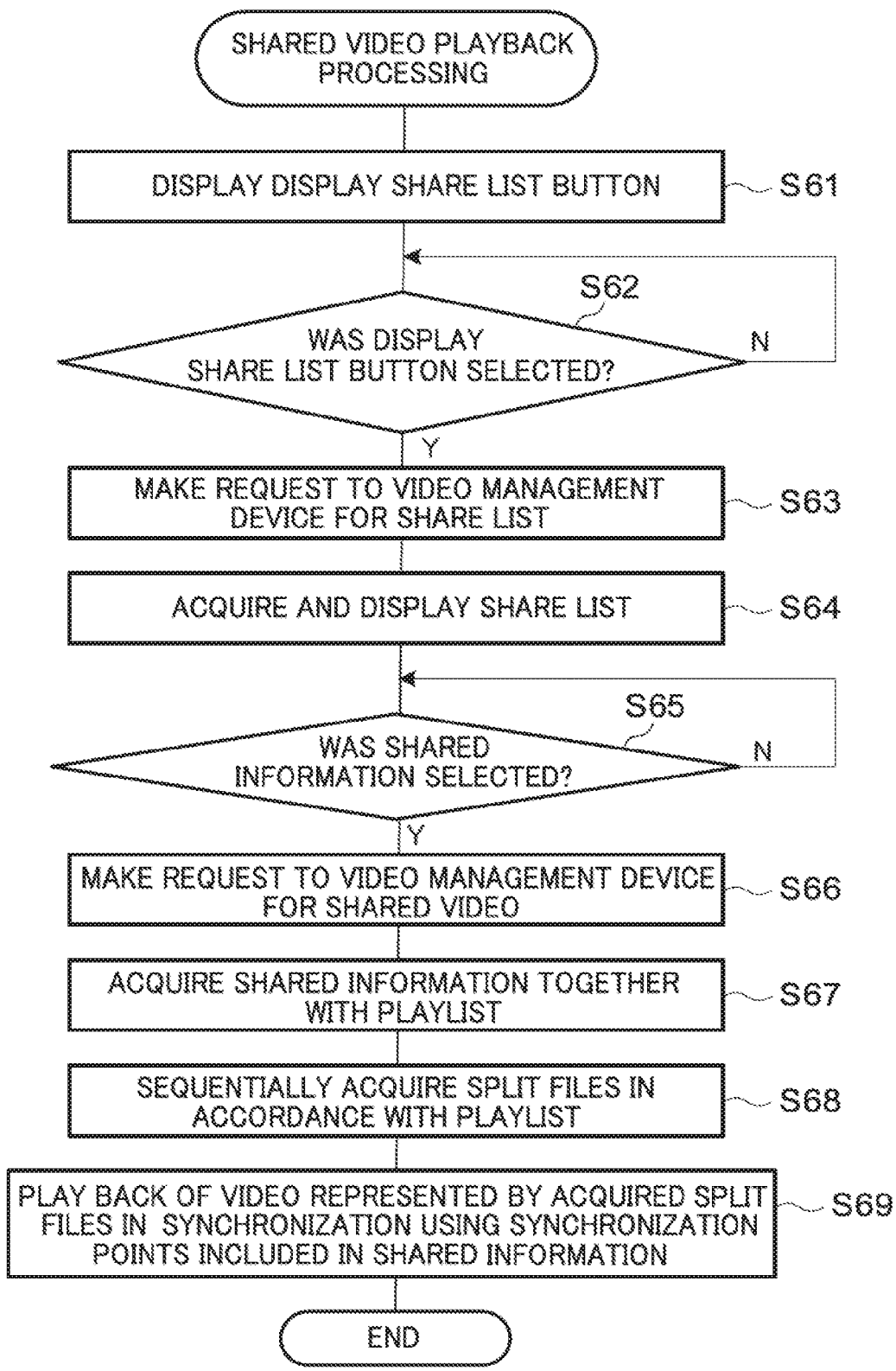
FIG. 13 is a flowchart illustrating an example of shared video playback processing.

However, when a notification has been made from the video management device 30 to the video playback device 20B stating that shared information usable by the logged-in user is present, the shared video playback processing illustrated in FIG. 13 is executed in the video playback device 20B.

At step S61, the acquisition section 21 notifies the display controller 22 that shared information usable by the logged-in user is present, and having received this notification, the display controller 22 displays the display share list button 72 on the video playback screen 60.

Next, at step S62, the display controller 22 determines whether or not the display share list button 72 has been selected by the user. Processing transitions to step S63 in cases in which the display share list button 72 has been selected, or the determination of the current step is repeated in cases in which the display share list button 72 has not been selected.

At step S63, the display controller 22 notifies the acquisition section 21 that the display share list button 72 has been selected, and having received the notification, the acquisition section 21 makes a request to the video management device 30 for the share list. Next, at step S64, the acquisition section 21 acquires the share list transmitted from the video management device 30 according to the request, and passes the acquired share list. to the display controller 22. The display controller 22, for example, displays a share list screen 80 like that illustrated in FIG. 6.

Next, at step S65, in a state in which at least one row has been selected from the share list 81 of the share list screen 80, the display controller 22 determines whether or not shared information has been selected by the user by determining whether or not the select button 82 has been selected. Processing transitions to step S66 in cases in which shared information has been selected, or the determination of the current step is repeated m cases in which shared information has not been selected.

At step S66, the display controller 22 notifies, to the acquisition section 21, the username and the user-distinct shared information number linked to the row selected in the share list 81. Having received the notification, the acquisition section 21 makes a request to the video management device 30 for the shared videos. The display controller 22 also closes the share list screen 80 and returns to displaying the video playback screen 60.

Next, at step S67, the acquisition section 21 acquires the shared information and the playlist transmitted from the video management device 30 according to the request. Next, at step S68, the acquisition section 21 sequentially acquires the split files from the video management device 30 in accordance with the playlist, and passes the acquired split files to the display controller 22 together with the shared information acquired at step S67 above.

Next, at step S69, the display controller 22 sequentially plays back the video represented by the acquired split files. When this is performed, the display controller 22 controls the playback timing of the two videos 62L, 62R such that the two videos 62L, 62R are played back in synchronization, starting from the timestamps indicated by the synchronization points included in the shared information. The shared video playback processing then ends.

As explained above, in the video playback system 10 according to the first exemplary embodiment, the video playback device 20 receives the synchronization point from which playback of the left video and the right video in synchronization is to start, and transmits the received synchronization point to the video management device 30. The synchronization point is then managed as shared information in the video management device 30. Then, when the shared video is played back, in the video playback device 20, shared information is also acquired together with the playlist, and both of the videos are played back in synchronization, starting from the synchronization points indicated by the shared information. This enables a user who has compared plural videos to share the playback timings of the respective videos with another user, such that playback is performed at the same timings.

Moreover, in the present exemplary embodiment, the playback timings of the two videos are shared between users. There is therefore no need to use editing tools or the like to newly generate and store videos in a synchronized state separately to the plural videos to be compared. Increases in the video data volume stored in the video DB 32 can thus be suppressed, Second Exemplary Embodiment Next, explanation follows regarding a video playback system according to a second exemplary embodiment. In the second exemplary embodiment, explanation follows regarding a case in which drawing data input to a video being played back in synchronization is also shared. In the video playback system according to the second exemplary embodiment, portions similar to those of the video playback system 10 according to the first exemplary embodiment are allocated the same reference numerals and detailed explanation thereof is omitted.

As illustrated in FIG. 1, a video playback system 210 according to the second exemplary embodiment includes a video playback device 220 and a video management device 230. The video playback device 220 and the video management device 230 are connected to each other through a network.

Similarly to in the first exemplary embodiment, the video management device 230 includes a controller 231 that controls distribution of video data to the video playback device 220 and the like, and a video DB 232 storing plural items of video data that can be provided to the user.

Similarly to in the first exemplary embodiment, the controller 231 manages shared information for sharing playback timings of videos between users. The controller 231 also manages shared information related to drawing data indicating drawing input to the respective videos 62L, 62R. FIG. 14 illustrates an example of a shared information table 232A stored in the video DB 232. In addition to each item of the shared information table 32A of first exemplary embodiment, the example of FIG. 14 includes "drawing data 1" representing identification information of the drawing data drawn on the left video 62L, and "drawing data 2" representing identification information of the drawing data drawn on the right video 62R. The identification information of the drawing data can, for example, be a path to a storage destination of the drawing data. The shared information table 232A also includes a "display duration of drawing, data 1" item and a "display duration of drawing data 2" item that indicate a start timing and an end timing of a duration in which to display the drawings indicated by the respective items of drawing data.

When the controller 231 has received shared information and drawing data transmitted from the video playback device 220, the controller 231 stores the drawing data in the video DB 232. Similarly to in the first exemplary embodiment, the controller 231 also allocates a user-distinct shared information number to the shared information and stores this in the shared information table 232A. The controller 231 also registers, in "drawing data 1" and "drawing data 2" of the shared information table 232A, the identification information (for example, the storage destination path) of the drawing data received together with the shared information.

In cases in which a request has been made from the video playback device 220 for a shared video that includes drawing data, the controller 231 also acquires, from the video DB 232, the drawing data specified by the "drawing data 1" and the "drawing data 2" included in the shared information. The controller 231 then transmits the acquired drawing data to the video playback device 220 together with the shared information and the playlist.

As illustrated in FIG. 1, the video playback device 220 functionally includes an acquisition section 221 and a display controller 222. Note that the display controller 222 is an example of a reception section and a playback controller of technology disclosed herein.

Although the acquisition section 221 is generally similar to the acquisition section 21 according to the first exemplary embodiment, the acquisition section 221 additionally transmits the drawing data, described below when the shared information is transmitted to the video management device 230. Moreover, in cases in which a request has been made to the video management device 230 for a shared video that includes drawing data, the acquisition section 221 also acquires the drawing data from the video management device 230 together with the shared information and the playlist, and passes the shared information and the drawing data to the display controller 222.

Figure 15:
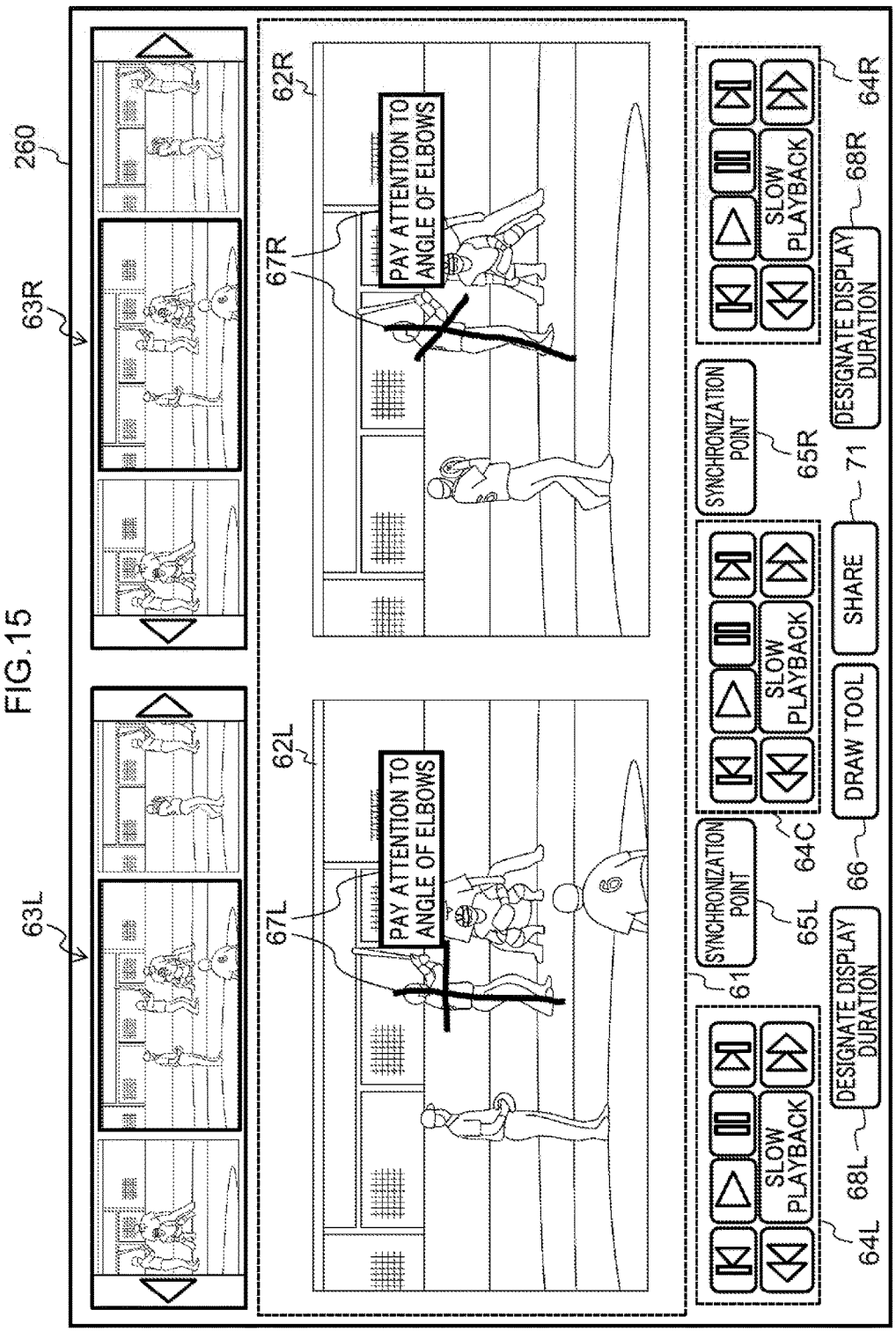
FIG. 15 is a diagram illustrating an example of a video playback screen of the second exemplary embodiment.

When the display controller 222 has received a playlist listing from the acquisition section 221, the display controller 222, for example, displays a video playback screen 260 like that illustrated in FIG. 15 on the display section. In addition to each configuration of the video playback screen 60 of the first exemplary embodiment, the video playback screen 260 includes a drawing tool button 66, a left image display duration designation button 68L, and a right image display duration designation button 68R. When the drawing tool button 66 has been selected, the display controller 222 displays a drawing tool (omitted from illustration) for drawing, for example, graphics or text. The user uses the drawing tool to respectively input, for example, graphics or text onto left video 62L and the right video 62R. The display controller 222 respectively receives a drawing 67L, such as graphics and text, input onto the left video 62L, and a drawing 67R input onto the right video 62R, and stores the respectively received drawings 67L, 67R in a specific storage region as drawing data that holds coordinate values corresponding to the respective display positions of the videos 62L, 62R, The respective display duration designation buttons 68L, 68R are for receiving the designation of the duration in which to perform superimposed display of the drawing 67L, 67R on the respective videos 62L, 62R. Suppose the left video display duration designation button 68L is selected during playback of the left video 62L in a state in which the drawing data indicated by the drawing 67L is stored. In such cases, the display controller 222 acquires, as the start timing for superimposed display of the drawing 67L, the timestamp indicating the timing at which the left video display duration designation button 68L was selected. Moreover, when the left video display duration designation button 68L has again been selected, the display controller 222 acquires, as the end timing of superimposed display of the drawing 67L, the timestamp indicating the timing at which the left video display duration designation button 68L was selected. Likewise for the drawing 67R, the display controller 222 acquires the respective timestamps indicating the start timing and the end timing of superimposed display of the drawing 67R, based on the timings at which the right image display duration designation button 68R was selected. The display controller 222 stores the acquired timestamp information in a specific storage region in association with the stored drawing data.

Note that the timings indicating the display durations of the drawings 67L, 67R are not limited to being acquired by the above method. For example, in cases in which drawing has been performed in a state in which a video has been paused, the timestamp corresponding to the frame image being displayed at that time may be acquired as the timestamp indicating the start timing. Moreover, in cases in which drawing has been performed during video playback, timestamps respectively corresponding to the frame images displayed at the starting point in time and ending point in time of the drawing may be acquired as timestamps respectively indicating the start timing and end timing.

Moreover, similarly to in the first exemplary embodiment, when the share button 71 has been selected, the display controller 222 generates shared information in which the username of the logged-in user has been appended to the respective playlist names of the left video 62L and the right video 62R and the timestamps indicating the synchronization points. The display controller 222 also adds, to the shared information, the timestamps indicating the display duration of the drawings 67L, 67R respectively corresponding to the videos 62L, 62R. The display controller 222 passes the generated shared information to the acquisition section 221 together with the drawing data.

Moreover, in cases in which shared information has been received from the acquisition section 221 together with the split files, the display controller 222 controls the playback timings when the videos represented by the split files are sequentially played back, in accordance with the time stamps indicating the synchronization points included in the shared information. Moreover, in cases in which the drawing data has also been received together with the shared information, the display controller 222 displays the drawings 67L. 67R indicated by the received thawing data superimposed on the respective videos 62L, 62R at timings according to the display duration information of the drawing data included in the shared information.

For example, suppose the display controller 222 receives the shared information in the first row of the shared information table 232A illustrated in FIG. 14. In such cases, the display controller 222 sequentially plays back the video represented by the split files acquired according to the playlist 1 as the left video 62L, and sequentially plays back the video represented by the split files acquired according to playlist 2 as the right video 62R. When this is performed, the display controller 222 plays back the left video 62L and the right video 62R in synchronization, starting from the timing of a timestamp t1 of the left video 62L and the timing of a timestamp t2 of the right video 62R. In the duration from timestamp t3 to timestamp t4 of the left video 62L, the display controller 222 also displays the drawing 67L indicated by the drawing data "AAA.gif", superimposed on the left video 62L. In the duration from timestamp t5 to timestamp t6 of the right video 62R, the display controller 222 also displays the drawing 67R indicated by the thawing data "BBB.gif", superimposed on the right video 62R.

The video playback device 220 may, for example, be implemented by the computer 40 illustrated in FIG. 7. A video playback program 250 that causes the computer 40 to function as the video playback device 220 is stored in the storage section 43 of the computer 40. The video playback program 250 includes the acquisition process 251 and a display control process 252.

The CPU 41 reads the video playback program 250 from the storage section 43, expands the video playback program 250 into the memory 42, and sequentially executes the processes included in the video playback program 250. The CPU 41 operates as the acquisition section 221 illustrated in FIG. 1 by executing the acquisition process 251. The CPU 41 also operates as the display controller 222 illustrated in FIG. 1 by executing the display control process 252. The computer 40, which executes the video playback program 250, thereby functions as the video playback device 220.

Functionality implemented by the video playback program 250 can also be implemented by, for example, a semiconductor integrated circuit, and more specifically, by an ASIC or the like.

Next, explanation follows regarding operation of the video playback system 210 according to the second exemplary embodiment. The second exemplary embodiment differs from the first exemplary embodiment in that processing related to drawing data is performed, and explanation therefore follows regarding processing related, to the drawing data.

Figure 16:
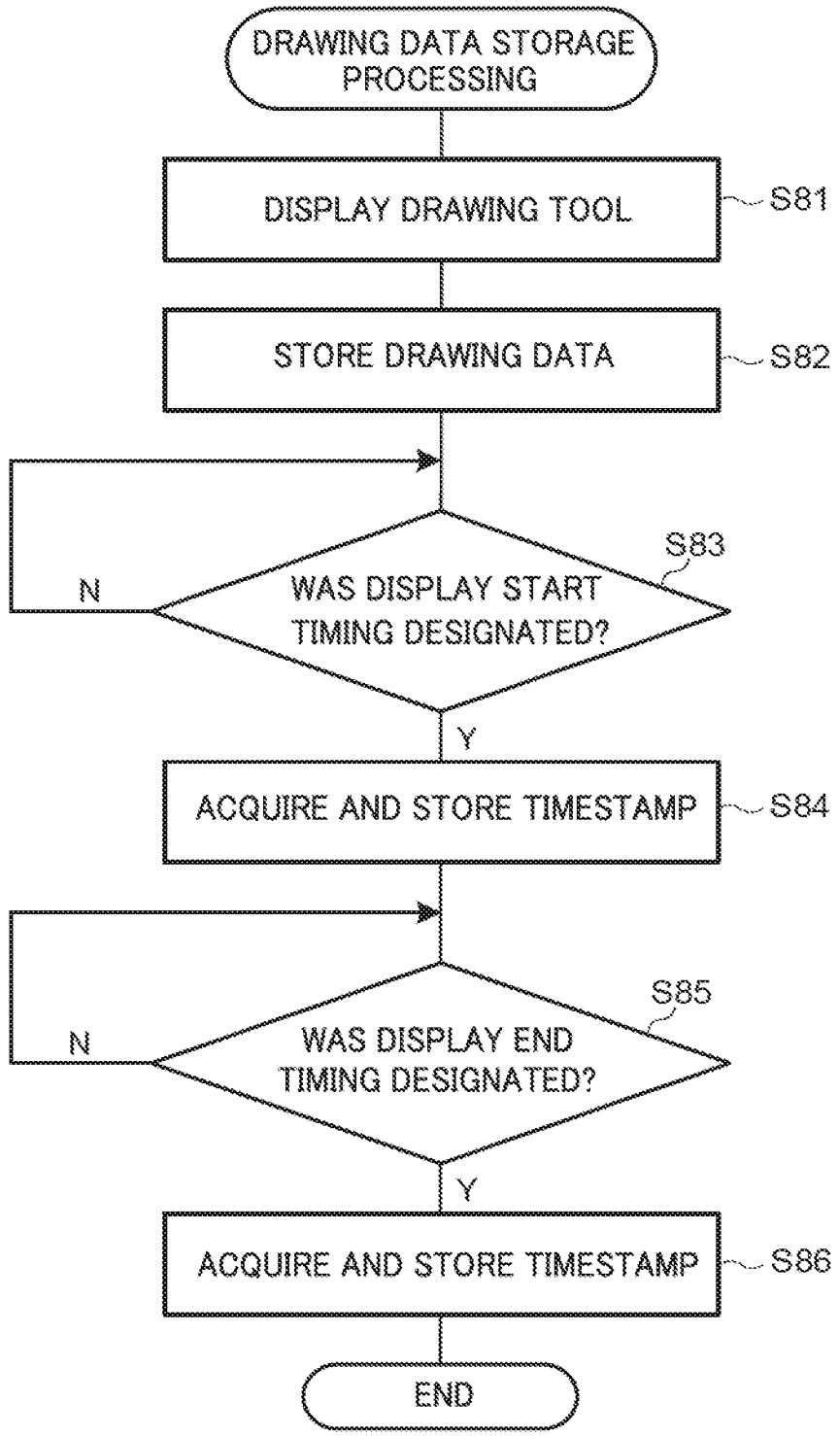
FIG. 16 is a flowchart illustrating an example of drawing data storage processing.

When the drawing tool button 66 displayed on the video playback screen 260 has been selected, the drawing data storage processing illustrated in FIG. 16 is executed in the video playback device 220.

At step S81, the display controller 222 displays the drawing tool for drawing graphics, text, and the like. Next, at step S82, the drawings 67L, 67R, such as graphics and text, that were respectively input to the left video 62L and the right video 62R by the user the drawing tool are received. The display controller 222 then stores the respectively received drawings 67L, 67R in a specific storage region as drawing data holding coordinate values corresponding to display positions in the respective videos 62L, 62R.

Next, at step S83, the display controller 222 determines whether or not start timings for superimposed display of the drawing 67L or 67R have been designated by selecting either of the display duration designation buttons 68L, 68R. Processing transitions to step S84 in cases in which a start timing has been designated, or the determination of the current step is repeated in cases M which no start timing has been designated. At step S84, the display controller 222 acquires the timestamp indicating the timing at which either of the display duration designation buttons 68L, 68R was selected. The display controller 222 then stores the acquired timestamp information as the start timing for superimposed display of the drawing 67L or 67R, in association with the drawing data indicating the drawing 67L or 67R stored in the specific storage region.

Next, at step S85, the display controller 222 determines whether or not an end timing for superimposed display of the drawing 67L or 67R has been designated by the display duration designation button 68L or 68R selected at step S83 above being selected again. Processing transitions to step S86 in cases in which an end timing has been designated, or the determination of the current step is repeated in cases in which no end timing has been designated. At step S86, the display controller 222 acquires the timestamp indicating the timing at which the display duration designation button 68L or 68R was selected. The display controller 222 then stores the acquired timestamp information as the end timing for superimposed display of the drawing 67L or 67R, in association with the drawing data indicating the drawing 67L or 67R stored in the specific storage region. The drawing data storage processing then ends.

The video playback device 220 executes shared information transmission processing that is generally similar to the shared information transmission processing of the first exemplary embodiment (FIG. 10). However, in the shared information transmission processing of the second exemplary embodiment, at step S33, the display controller 222 also acquires the drawing data and timestamp information indicating the start and end timings, stored in association with the drawing data, from the specific region of the storage region. At step S34, the display controller 222 generates shared information in which the username of the logged-in user is appended to the two acquired playlist names, the synchronization point information, and the timestamp information indicating the start and end timings for display of the drawing data.

Moreover, the video management device 230 executes shared information reception processing that is generally similar to the shared information reception processing of the first exemplary embodiment (FIG. 11). However, in the shared information reception processing of the second exemplary embodiment, at step S42, the controller 231 registers identification information (for example, the storage destination path) of the received drawing data, together with the shared information, in "drawing data 1" and "drawing data 2" of the shared information table 232A.

Moreover, the video management device 230 executes shared video transmission processing generally similar to the shared video transmission processing of the first exemplary embodiment (FIG. 12). However, in the shared video transmission processing of the second exemplary embodiment, at step S55, in cases in which a shared video that includes drawing data has been requested from the video playback device 220, the controller 231 executes the following processing at step S56. The controller 231 acquires, from the video DB 232, the drawing data specified by the "drawing data 1" and the "drawing data 2" included in the shared information selected from the share list. The controller 231 then transmits the acquired drawing data to the video playback device 220 together with the shared information and the playlists.

Moreover, the video management device 230 executes shared video playback processing that is generally similar to the shared video playback processing of the first exemplary embodiment (FIG. 13). However, in the shared video playback processing of the second exemplary embodiment, in cases in which drawing data was also acquired together with the playlists and the shared information at step S67, the display controller 222 executes the following processing at step S69. The display controller 222 controls the playback timings at which the videos represented by the split files are sequentially played back, in accordance with the timestamps of the playlist 1 and the playlist 2 included in the shared information. Moreover, the splay controller 222 displays he drawings 67L, 67R indicated by the received drawing data superimposed on the respective videos 62L, 62R, at timings according to the display duration information of the drawing data included in the shared information.

As explained above, in the video playback system 210 according to the second exemplary embodiment, the video playback device 220 receives drawings input onto the video, and designations of the display durations for the drawings. The identification information of the input drawings and the display durations of the drawing are also then included in the shared information. This enables drawings that a user has made on videos when comparing plural videos to be shared with other users, and displayed superimposed on the videos at timings designated by the user.

Moreover, in the present exemplary embodiment, drawings made on videos are shared between users, and there is therefore no need to use editing tools or the like to newly generate and store videos on which a drawing was made, thereby enabling increases in the amount of video data stored in the video DB 232 to be suppressed.

Although explanation has been given with reference to an example in the second exemplary embodiment in which drawing has been performed on both the left video 62L and the right video 62R, drawing may be performed on either one of the videos alone and does not need to be performed on both of the videos 62L, 62R. For example, the same playlist may be selected for the left video 62L and the right video 62R, drawing may be performed on one of the videos alone, the video having the drawing and the video without the drawing may be played back in synchronization and both videos may be compared.

Figure 17:
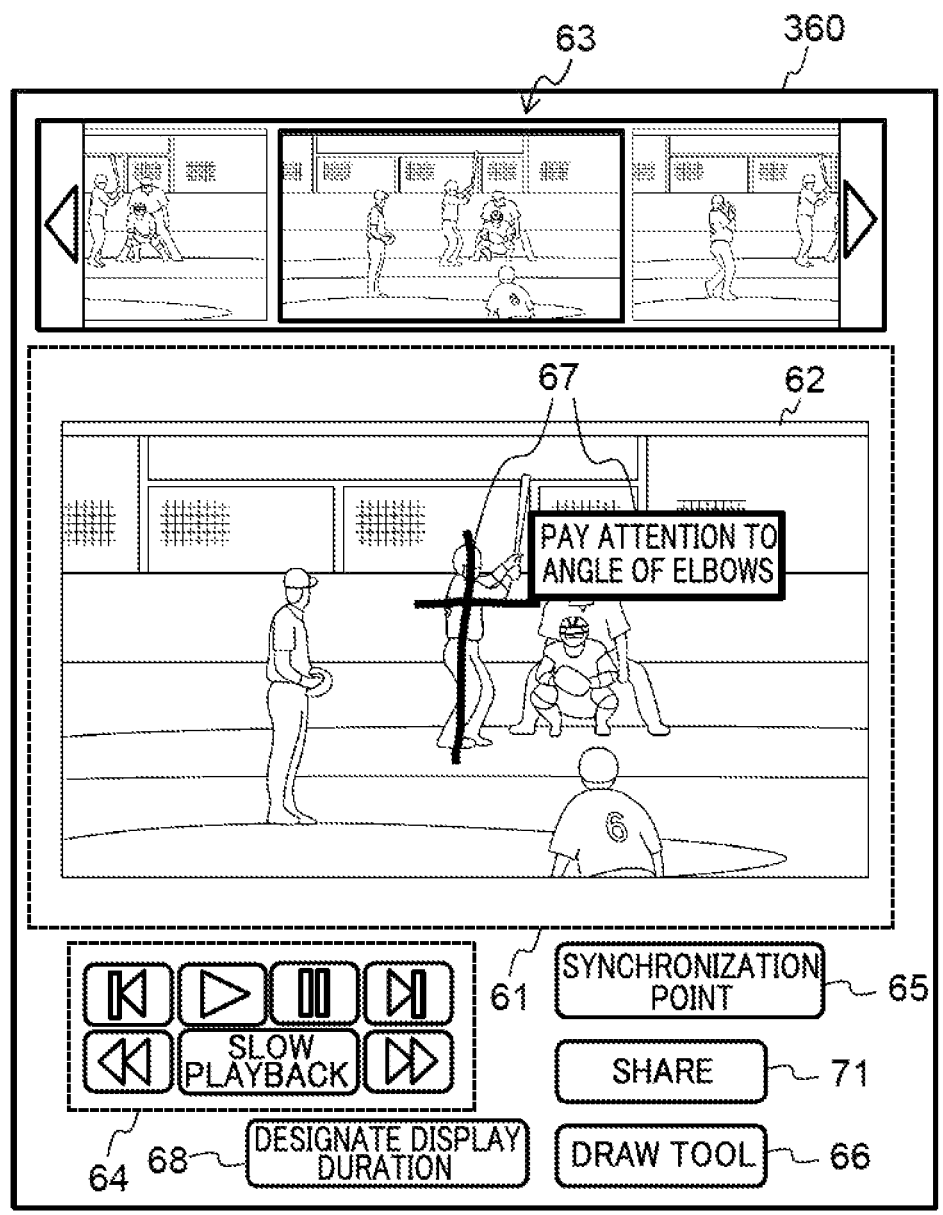
FIG. 17 is a diagram illustrating another example of a video playback screen.
Figures 18, 19:
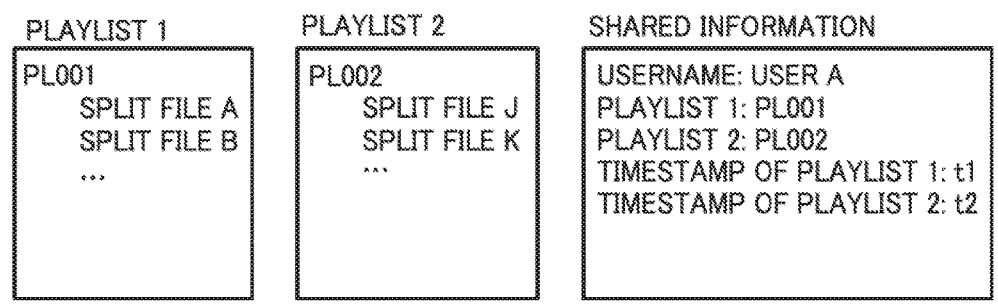
FIG. 18 is a diagram illustrating another example of a shared information table.
FIG. 19 is a diagram for explaining examples of file formats for a playlist and shared information.

Moreover, sharing of drawings is also applicable to drawings on a single video being played back. For example, as illustrated in FIG. 17, a drawing 67 made on a single video 62 can be shared similarly to in the second exemplary embodiment in cases in which the video 62 is being played back in the video playback region 61. An example of the sharing information table 332A managed by the video management device in such cases is illustrated in FIG. 18. In the video playback device of the reception side user, the video 62 represented by the sequentially acquired split files in accordance with the playlist is sequentially played back in cases in which this shared information has been selected. The drawing 67 indicated by the drawing data "AAA.gif" is displayed superimposed on the video 62 for the duration of from timestamp t3 to timestamp t4 of the video 62. Accordingly, the video on which drawing has been performed by the transmission side user can be shared with the reception side user.

Figure 20:
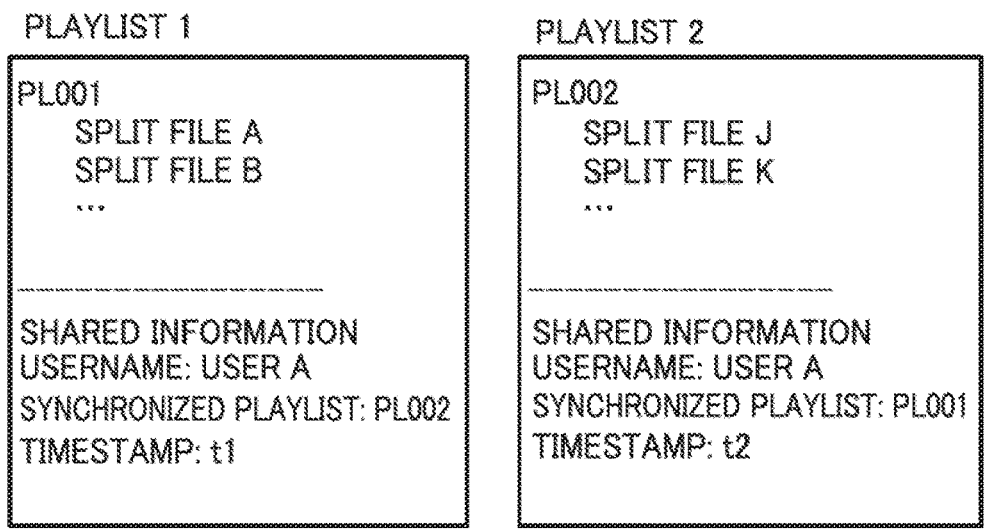
FIG. 20 is a diagram for explaining examples of file formats for a playlist and shared information.
Figure 21:
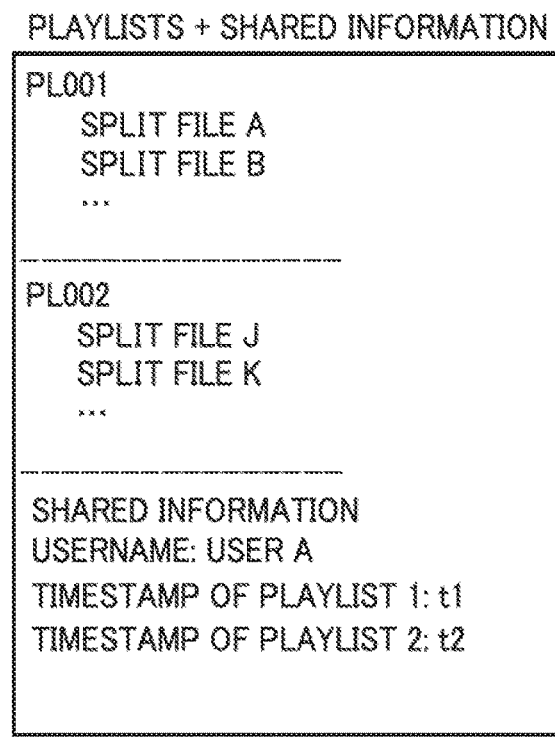
FIG. 21 is a diagram for explaining an example of file formats for a playlist and shared in formation.

In each of the exemplary embodiments above, the formats of the playlist and the shared information transmitted to the video playback device of the reception side user that plays back the video using the shared information are not limited. For example, as illustrated in FIG. 19, the playlist may be a file conforming to a predetermined standard such as the m3u8 format in HLS, and may be a file in which shared information is generated separately. Moreover, as illustrated in FIG. 20, a format in which the shared information is appended to each playlist may be employed. In such cases, information specifying a playlist indicating the video to be played back in synchronization with the video indicated by the playlist itself may also be included in the shared information. Moreover, as illustrated in FIG. 21, a file in which the playlists of two videos to be played back in synchronization with each other are combined with the shared information into a single tile may be employed. Moreover, when the video management device manages each item of data, each item of data may be stored in a video DB in the formats illustrated in FIG. 19 to FIG. 21.

In each of the exemplary embodiments above, explanation has been given regarding cases in which split files obtained by splitting a single item of video data at specific time intervals are sequentially acquired and played back in accordance with a playlist, namely, cases in which the subject is video data managed while split into plural segments; however, there is no limitation thereto. For example, video data managed with each segment as an individual file could be the subject, as in MPEG-4. In such cases, the filename of each file may be included in the shared information in place of the playlist name.

Although explanation has been given regarding examples of cases in which two videos are compared in each of the exemplary embodiments above, technology disclosed herein may also be applied when comparing three or more videos.

Although the drawings illustrate cases in which baseball videos are played back in each of the exemplary embodiments above, the videos that are made the subject may be videos of another sport such as tennis or golf, or may be videos other than a sports videos.

Although explanation was given above regarding a mode in which the video playback program 50. 250 was pre-stored (installed) to the storage section 43, there is no limitation thereto. The program according to technology disclosed herein may be provided in a mode recorded onto a recording medium such as a CD-ROM. DVD-ROM, or USB memory.

One aspect of technology disclosed herein enables a synchronized playback state of plural videos to be shared.

All examples and conditional language provided herein are intended for the pedagogical purposes of aiding the reader in understanding the invention and the concepts contributed by the inventor to further the art, and are not to be construed as limitations to such specifically recited examples and condition, nor does the organization of such examples in the specification relate to a showing of the superiority and inferiority of the invention. Although one or more embodiments of the present invention have been described in detail, should be understood that the various changes, substitutions, and alterations could be made hereto without departing, from the spirit and scope of the invention.

What is claimed is:

1. A non-transitory recording medium storing a video playback program that causes a computer to execute a process, the process comprising:
   receiving respective designations of a given timing during video playback for each of a plurality of videos, the respective designations of the given timing being different timings for each of the plurality of videos; and
   according to a playback instruction for each of the plurality of videos, playing back each of the plurality of videos on each of a plurality of video playback regions provided on a video playback screen, and playing back in synchronization timing of frames corresponding to the respective designations of the given timing for each of the plurality of videos.

2. The non-transitory recording medium of claim 1, wherein:
   the process further comprises storing timings at which a button input was received during playback of the videos; and
   in the process, the playing back in synchronization includes playing back the plurality of videos in synchronization starting from the stored timings.

3. The non-transitory recording medium of claim 1, wherein the process further comprises:
   receiving an input of text or a graphic in a video display region for at least one of the plurality of videos; and
   playing back the plurality of videos with the received text or the received graphic superimposed thereon.

4. A video playback device, comprising:
a processor configured to execute a process, the process comprising:
   receiving respective designations of a given timing during video playback for each of a plurality of videos, the respective designations of the given timing being different timings for each of the plurality of videos; and
   according to a playback instruction for each of the plurality of videos, playing back each of the plurality of videos on each of a plurality of video playback regions provided on a video playback screen, and playing back in synchronization timing of frames corresponding to the respective designations of the given timing for each of the plurality of videos.

5. The video playback device claim 4, wherein:
   the process further comprises storing timings at which a button input was received during playback of the videos; and
   in the process, the playing back in synchronization includes playing back the plurality of videos in synchronization starting from the stored timings.

6. The video playback device of claim 4, wherein the process further comprises:
   receiving an input of text or a graphic in a video display region for at least one of the plurality of videos; and
   playing back the plurality of videos with the received text or the received graphic superimposed thereon.

7. A video playback method, comprising:
   receiving respective designations of a given timing during video playback for each of a plurality of videos, the respective designations of the given timing being different timings for each of the plurality of videos; and
   by a processor, according to a playback instruction for each of the plurality of videos, playing back each of the plurality of videos on each of a plurality of video playback regions provided on a video playback screen, and playing back in synchronization timing of frames corresponding to the respective designations of the given timing for each of the plurality of videos.

8. The video playback method of claim 7, further comprising storing timings at which a button input was received during playback of the videos, wherein, the playing back in synchronization includes playing back the plurality of videos in synchronization starting from the stored timings.

9. The video playback method of claim 7, further comprising:
   receiving an input of text or a graphic in a video display region for at least one of the plurality of videos; and
   playing back the plurality of videos with the received text or the received graphic superimposed thereon.

* * * * *